United States Patent [19]

Masuda et al.

[11] Patent Number: 4,549,314
[45] Date of Patent: Oct. 22, 1985

[54] OPTICAL COMMUNICATION APPARATUS

[75] Inventors: Shunichi Masuda, Kawasaki; Yukio Satoh, Tokyo, both of Japan

[73] Assignee: Canon Kabushiki Kaisha, Tokyo, Japan

[21] Appl. No.: 450,239

[22] Filed: Dec. 16, 1982

[30] Foreign Application Priority Data

Dec. 25, 1981 [JP] Japan .................. 56-209032
Dec. 25, 1981 [JP] Japan .................. 56-209033

[51] Int. Cl.⁴ ............................. H04B 9/00
[52] U.S. Cl. .................. 455/618; 455/606; 455/612; 455/613
[58] Field of Search .......... 455/606, 607, 617, 618, 455/612, 609, 610, 613; 350/96.15, 96.16; 250/227

[56] References Cited

U.S. PATENT DOCUMENTS

| 2,404,696 | 7/1946 | Deal ........................ 455/607 |
| 2,406,000 | 4/1949 | Brown ....................... 455/606 |
| 3,943,358 | 3/1976 | Reymond et al. .............. 455/612 |
| 4,008,390 | 2/1977 | Runge ....................... 455/612 |
| 4,321,707 | 3/1982 | Beasley et al. .............. 455/606 |
| 4,420,840 | 12/1983 | Livermore .................. 455/606 |

FOREIGN PATENT DOCUMENTS 54-50203 4/1979 Japan ..................... 455/612

OTHER PUBLICATIONS

Campbell et al., "T3 Rate Fiber Optic", Conf. Intelcon 79 Expo. Proc., Dallas, TX, Feb. 26–Mar. 2, 1979, pp. 177–183.

Primary Examiner—Joseph A. Orsino, Jr.
Attorney, Agent, or Firm—Fitzpatrick, Cella, Harper & Scinto

[57] ABSTRACT

An optical communication apparatus has the transmission/reception modules which perform conversion of a light signal from an LED into an electric signal and vice versa. A movable shutter is located above the monitoring window of a light guide so as to allow prevention of crosstalk. A monitoring light-receiving element can be included to allow monitoring of the status of the light signal. A signaling device such as an indicator, a buzzer or the like can be operated in accordance with an output signal from the monitoring light-receiving element.

1 Claim, 7 Drawing Figures

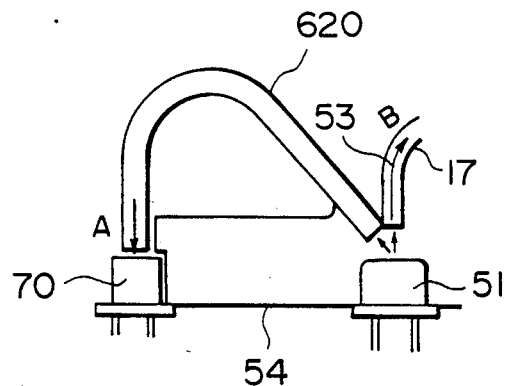
F I G. 5
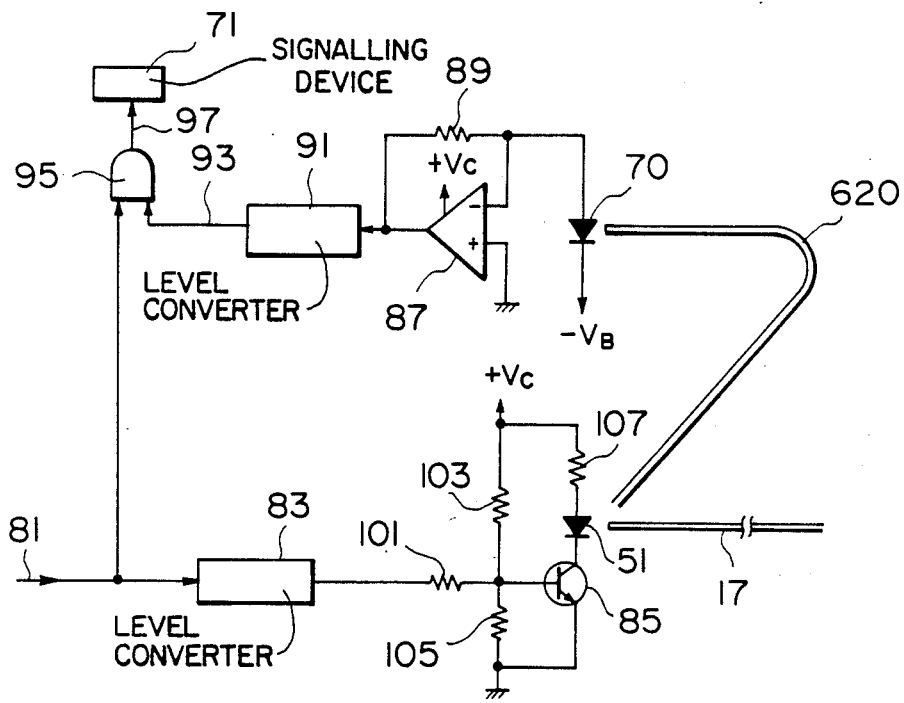
F I G. 6

OPTICAL COMMUNICATION APPARATUS

BACKGROUND OF THE INVENTION

1. Field of the Invention

The present invention relates to a communication apparatus for optical communication.

2. Description of the Prior Art

FIG. 1 shows the outer appearance of a transmission/reception module as a signal processing means of a conventional optical communication apparatus. Two transmission/reception modules 11 and 13 are optically coupled through an optical fiber cable 20 consisting of two optical fibers 15 and 17. The optical fiber is made of quartz, plastic or the like. The modules 11 and 13 are mounted on and electrically connected to optical communication equipment (not shown) through connectors 23 and 25, respectively, which are arranged on the outer casings of modules 11 and 13. Mutual conversion of electric signals and light signals between the electric circuitry of the transmission/reception modules 11 and 13 and the optical fiber cable 20 is performed by signal converters 27 and 29, respectively. In a transmission/reception module of the type described above, light signals which are obtained by conversion from the electric signals by one module, or light signals to be converted into the electric signals, which are received from the other module are transmitted through the optical fiber bundles 15 and 17. Conversion between light signals and electric signals is not always necessary. For example, the optical shielding means is generally incorporated in order to prevent adverse effects of ambient light. For this reason, transmitting state of the optical fiber cannot easily be monitored. An abnormal transmitting state may be left unnoticed. This also applies to the case wherein light/electric conversion is not involved.

FIG. 2 shows the transmission/reception module 11 shown in FIG. 1 in greater detail. A light signal 31 transmitted from the other module 13 through the optical fiber bundle 15 is received by a light-receiving element 33 and is converted into an electric signal thereby. The electric signal from the light-receiving element 33 is amplified by an amplifier 35 and is supplied to an output pin 41 of the connector 23. A power supply voltage is supplied to the positive voltage terminal of the amplifier 35 through a positive voltage (+Vc) pin 43.

In the transmission system of the transmission/reception module 11, an electric signal is applied across an input pin 45 and a ground pin (GND) 47 of the connector 23. The electric signal is converted into a light signal 53 by a light-emitting diode (LED) 51. The light signal 53 is transmitted to the other module 13 through the optical fiber bundle 17. A resistor 55 interposed between the input pin 45 of the connector 23 and the light-emitting element 51 serves to limit the current flowing in the light-emitting element 51. If an LED for emitting visible light is used as the light-emitting element 51, a current of 10 to 20 mA may flow. This current flows to the ground pin 47 of the connector 23 in the direction indicated by arrow a. To the ground pin 47 are commonly connected the ground pin of the amplifier 35 as well as one terminal of each of the light-receiving element 33 and the light-emitting element 51 which are optically shielded to avoid adverse effects from an external light source. Therefore, the currents of the transmission system and the reception system flow in this commonly connected line.

The circuit components as described above are mounted on a printed circuit board 61. The conductor pattern formed on the printed circuit board 61 to which a current iR of the transmission system flows has a certain resistance. When this resistance is represented by an equivalent resistance Ro, a voltage drop of Eo (=Ro·iR) is produced across the pattern. Thus, the voltage drop Eo is superposed on the electric signal from the light-receiving element 33 of the reception system to provide an input signal to the amplifier 35. In this manner, the transmission signal adversely affects the reception signal to cause the problem of crosstalk.

SUMMARY OF THE INVENTION

The present invention has been made in consideration of this and has for its object to provide an optical transmission apparatus which has a signal processing means capable of preventing crosstalk between a transmission signal and a reception signal.

It is another object of the present invention to provide an optical communication apparatus which has a signal processing means capable of allowing monitoring of a light-emitting state of a light-emitting means for optical communication.

It is still another object of the present invention to provide an optical communication apparatus capable of allowing separation of ground lines of a transmitting means and a receiving means in a light signal processing means.

It is still another object of the present invention to provide an optical communication apparatus capable of preventing adverse effects of the voltage drop of a transmitting means on a receiving means in a light signal processing means.

It is still another object of the present invention to provide an optical communication apparatus having a light guide means for a light signal processing means.

It is still another object of the present invention to provide an optical communication apparatus capable of optically shielding a light guide means of a light signal processing means.

It is still another object of the present invention to provide an optical communication apparatus having a light-receiving means for a light guide means of a light signal processing means so as to allow detection of a light signal.

It is still another object of the present invention to provide an optical communication apparatus capable of signalling the state of a light signal detected by a light signal processing means.

BRIEF DESCRIPTION OF THE DRAWINGS

FIG. 5 is a partial enlarged view of a light guide 62 according to still another embodiment of the present invention;

FIG. 6 is a control block diagram of a signalling device 71 for signalling the state of a light signal according to the embodiment shown in FIG. 4.

DETAILED DESCRIPTION OF THE PREFERRED EMBODIMENTS

Figure 3:
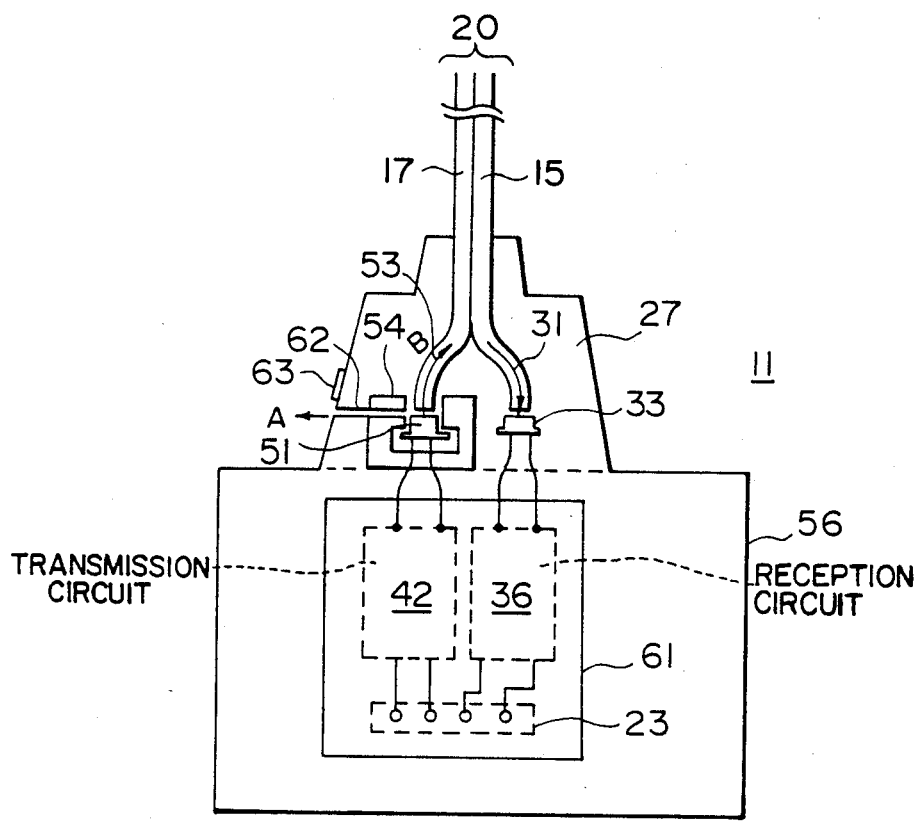
FIG. 3 is a view showing an optical communication apparatus according to an embodiment of the present invention.

The preferred embodiments of the present invention will now be described in detail with reference to the accompanying drawings. FIG. 3 shows an optical communication apparatus according to an embodiment of the present invention. Note that FIG. 3 only shows one transmission/reception module 11. A light signal 31 from the other transmission/reception module 13 is transmitted to the transmission/reception module 11 through an optical fiber 15. A light-receiving element 31 of the module 11 converts the input light signal 33 into an electric signal which is supplied to a reception circuit 36. The electric signal from a transmission circuit 42 is converted into a light signal 53 by a light-emitting element (LED) 51. The light signal 53 is transmitted to the other module 13 through an optical fiber 17. Circuit components of the reception and transmission circuits 36 and 42 are supported on a printed circuit board 61 so as to align the optical fiber 17 with the light-emitting element 51 by means of a support base 54. The support base 54 also serves to shield light.

The light signal 53 is transmitted in the direction indicated by arrow B for optical communication. The light-emitting element 51 generally has directivity, and light leaks in a direction deviated from the main direction. Leaked light is guided in the direction indicated by arrow A through an outer casing 56 of the module 1 and through a light guide 62 of the support base 54. The light-emitting state of the light-emitting element 51 can be directly monitored through detection of the leaked light. The module 11 may be a transmission module.

Figure 4:
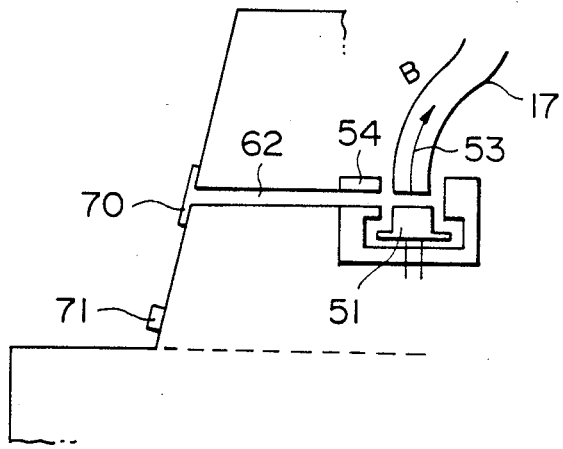
FIG. 4 is a partial enlarged view of a light guide 62 of an optical communication apparatus according to another embodiment of the present invention.

However, when external intense light is incident on the module 11, part of the incident light is superposed on the light signal 53 through the light guide 62, thus adversely affecting optical communication. In order to solve this problem, a movable shutter 63 is mounted on the outer casing 56 of the module 11 to be located above a monitoring window of the light guide 62. Adverse effects of external light may be eliminated by moving the shutter 63 downward to close the monitoring window of the light guide 62. The light guide 62 serves to guide part of the light (leaked light) to the outside. Therefore, if the light signal is not visible light, a monitoring light-receiving element 70 may be incorporated in the manner shown in FIG. 4. FIG. 4 is a partial enlarged view of the light guide 62 shown in FIG. 3, which has the light-receiving element 70. A signalling device signals the state of the light signal which is operated in accordance with an output from the light-receiving element 70. The signalling device 71 may comprise a display device, a buzzer or the like. A light guide, a light-receiving element and the like may be incorporated for the light signal processing means so as to allow monitoring of the light signal.

FIG. 5 is a partial enlarged view of a light guide 62 of an optical communication apparatus according to another embodiment of the present invention. Leaked light is guided from a light-emitting element (LED) 51 to a monitoring light-receiving element 70 through a light guide 620 consisting of optical fiber. As in the earlier embodiment, a signalling or indicator device 71 operative in accordance with an output from the light-receiving element 70 may be mounted on an outer casing 56 in the manner shown in FIG. 4. FIG. 6 is a block diagram of the light-emitting element 51, the monitoring light-receiving element 70, and the signalling device 71.

A transmission signal 81 to be transmitted by a transmitting module is supplied as a modulated signal to a drive transister 85 through a level converter 83. The light-emitting element 51 connected to the collector of the transistor 85 emits light when the logic level of the signal is "1" while it does not emit light when the logic level of the signal 81 is "0".

Light emitted by the LED 51 is guided through an optical fiber 17 for optical communication. Leaked light is guided to the light-receiving element 70 through the light guide 620 of optical fiber.

Light guided by the light guide 620 is guided to the light-receiving element 70 for monitoring. The light-receiving element 70 converts the incident light into an electric signal. The electric signal from the light-receiving element 70 is supplied to the inverting input terminal of a differential amplifier 87. An output signal of inverted polarity obtained from a voltage follower consisting of the differential amplifier 87 and a resistor 89 is supplied to a level converter 91. An output signal 93 as a monitoring signal from the level converter 91 is supplied to one input of AND gate 95. The signal 81 is supplied to the other input of the AND gate 95, which produces an output signal 97. A bias resistor 101 is interposed between the level converter 83 and the base of the transistor 85. A current-limiting resistor 107 limits the current flowing in the LED 51.

In the apparatus of the configuration as described above, when the signal 81 is at logic level "1", the light-emitting element 51 emits light, and the monitoring signal 93 is at logic level "1". Therefore, when the light-emitting element 51 is normal and the signal 81 is at logic level "1", the output signal 97 from the AND gate 95 is at logic level "1". On the other hand, if a circuit component such as the light-emitting element 51 is not operating normally, the output signal 97 is at logic level "0" even if the signal 81 is at logic level "1".

The AND gate 95 may be replaced by an exclusive OR gate. If an output signal 97 of logic level "1" is determined to indicate the abnormal state, an output signal 97 of logic level "0" indicates the normal state when the signal 81 is not present, that is, when the signal 81 is at logic level "0".

An indicating device 71 for signalling the light-emitting state, which is operated by the output signal 97, may be incorporated to allow reliable monitoring of the light-emitting state of the light-emitting element 51. Alternatively, a control signal such as one for prohibiting the operation of the apparatus may be used to prevent erratic operation of the apparatus.

Figure 1:
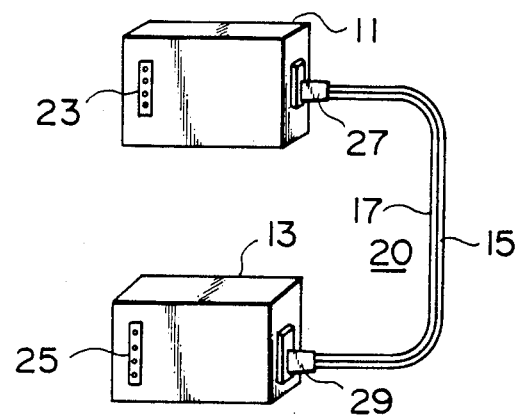
FIG. 1 is a view showing the outer appearance of a transmission/reception module as a light signal processing means in a conventional optical communication apparatus.
Figure 2:
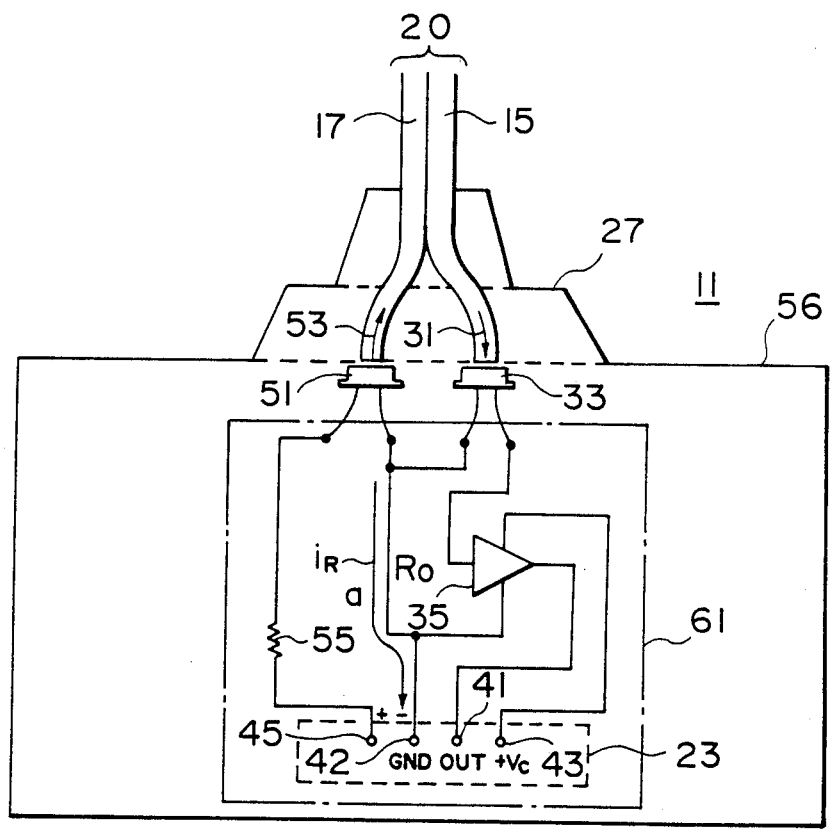
FIG. 2 is a view showing the transmission/reception module 11 shown in FIG. 1 in greater detail.
Figure 7:
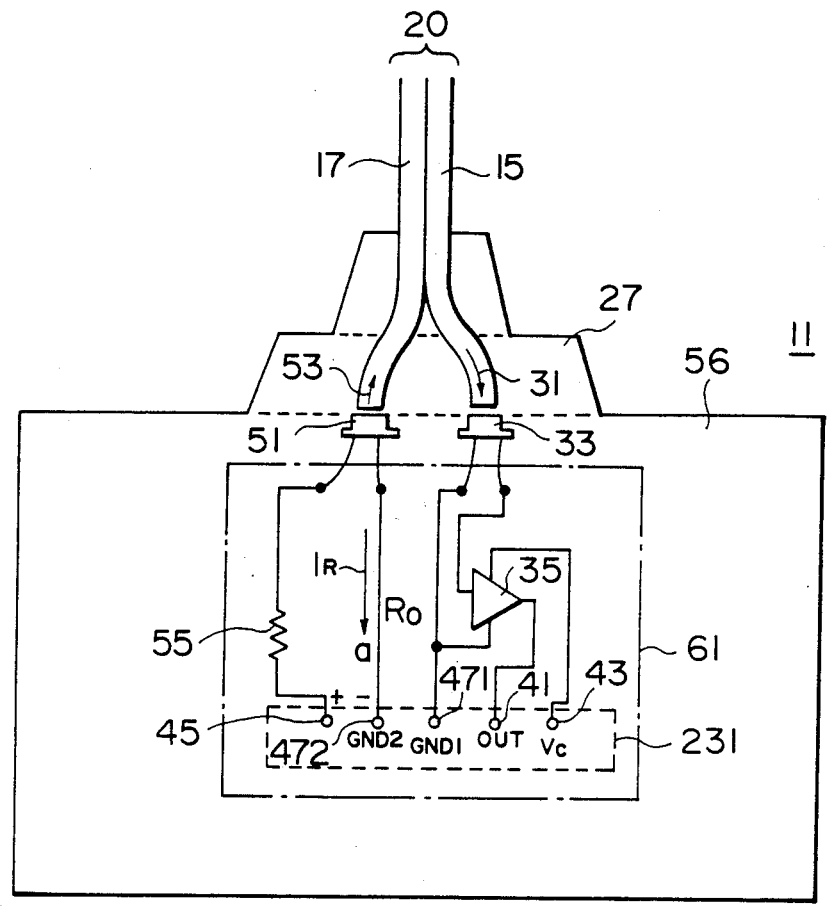
FIG. 7 is a view showing an optical communication apparatus according to still another embodiment of the present invention.

FIG. 7 shows an optical transmission apparatus according to still another embodiment of the present invention. A transmission/reception module of this embodiment 11 is similar that shown in FIG. 1, except that the ground line of the transmission system is disconnected from the ground line of the reception system. A common connecting line of one end of a light-receiving element 33 and a ground pin of an amplifier 35 is connected to a first ground pin (GND 1) 471 of a connector 231. One end of a light-emitting element (LED) 51 is connected to a second ground pin (GND 2) 472 of the connector 231. Since the ground lines of the transmission system and the reception system are separate from each other, a voltage drop Ro·iR across a resistance Ro of the conductor pattern of a printed circuit board 61 may not adversely affect the reception system. Thus, crosstalk is prevented. This also applies to the other transmission/reception module 13.

What we claim is:

1. An optical communication apparatus comprising:

conversion means for converting an electric signal representing predetermined data to a visible light signal in order to transmit the predetermined data as the light signal;

transmission means comprising an optical fiber for transmitting the light signal from the conversion means to a terminal therethrough;

light guide means for guiding leaked light from the light signal from the conversion means, which leaked light is not transmitted through the transmission means;

window means for enabling visual monitoring of the state of operation of the conversion means by means of the leaked light guided by the light guide means; and shield means for shielding the window means from the exterior so that exterior light entering through the light guide means does not have harmful influence on the light signal from the conversion means.

* * * * *